3,828,074
PROCESS FOR THE PRODUCTION OF 3-THIENYLACETIC ACID

John Kirby Quick, Redhill, Kenneth Richardson, Ashington, and Kenneth Utting, Lower Kingswood, England, assignors to Beecham Group Limited, Brentford, Middlesex, England
No Drawing. Filed Nov. 24, 1971, Ser. No. 201,998
Claims priority, application Great Britain, Nov. 25, 1970, 55,971/70
Int. Cl. C07d 63/12
U.S. Cl. 260—332.2 A
15 Claims

ABSTRACT OF THE DISCLOSURE

Thiophene is converted into 3-thienylacetic acid or an alkyl ester thereof via (a) 2,5-dichlorothiophene, (b) 2,5-dichloro-3-chloromethylthiophene, (c) the novel 2,5-dichloro-3-cyanomethylthiophene and (d) either 3- cyanomethylthiophene or the novel 2,5-dichloro-3-thienylacetic acid or an alkyl ester thereof. The produced 3-thienylacetic acid or an alkyl ester thereof can be further converted into 3-thienylmalonic acid which in turn may be converted to α-carboxy - 3 - thienylmethylpenicillin or an ester thereof.

---

This invention relates to a novel process for the production of 3-thienylmalonic acid, a compound useful as an intermediate in the production of penicillins of the general formula (I):

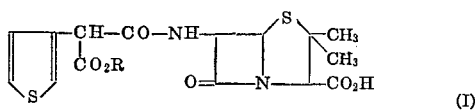

(I)

Compounds of general formula (I) in which R is an alkyl, aralkyl or ring substituted aralkyl group are disclosed in our British Pat. No. 1,125,557, and compounds of general formula (I) in which R is aryl are disclosed in our British Pat. No. 1,133,886. The corresponding α-carboxy penicillin (R=H) is disclosed in our British Pat. No. 1,004,670 and further described in our British Pat. No. 1,197,973.

In British Pat. No. 1,125,557 the penicillin of formula (I) was prepared from a 3-thienylmalonic ester itself synthesised from 3-thienyl-acetonitrile. The 3-thienylacetonitrile was prepared from 3-methylthiophene by the method of Campaigne et al. (J. Amer. Chem. Soc., 1948, 70, 1555) which involves reaction with N-bromosuccinimide and treatment of the resulting 3-bromoethylthiophene with sodium cyanide. However, this bromination gives the desired bromo-derivative in low yield and the 3-methylthiophene starting material is unduly expensive.

We have found that 3-thienylacetonitrile (and hence 3-thienylmalonic acid and the desired penicillins) can more advantageously be prepared using readily available thiophene as starting material. This synthetic route is carried through the following stages:

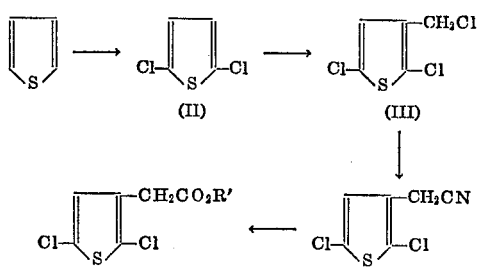

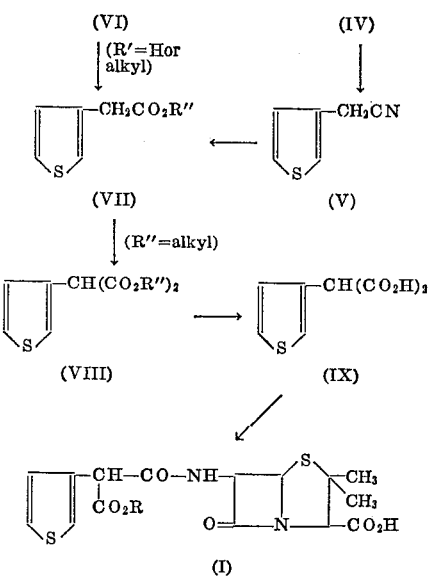

(R=hydrogen, alkyl, aralkyl, ring-substituted aralkyl, or aryl.)

It will be noted that compound (IV) can be converted to compound (VII) by either of the two alternative paths in the synthetic sequence.

The conversion of thiophene into 2,5-dichloro-3-chloromethylthiophene (III) has previously been described in British Patent Specification No. 1,160,565 as part of a synthetic route to 5-(lower)alkyl-3-chlorothienyl-4-isoxazolylpenicillins. However, the conversion of compound (III) to 3-thienylacetic acid (VII) has not hitherto been reported by either route and the intermediates of 2,5-dichloro - 3 - cyanomethylthiophene (IV) and 2,5 - dichloro - 3 - thienylacetic acid (VI) are novel compounds. These novel steps, therefore, enable the above mentioned synthetic route to be carried out.

According from one aspect the invention provides a process for the manufacture of 3-thienylacetic acid and derivatives thereof which comprises: (a) subjecting thiophene to chlorination; (b) subjecting the resulting 2,5-dichlorothiophene to chloromethylation; (c) treating the formed 2,5 - dichloro - 3 - chloromethylthiophene with cyanide ions; and (d) conversion of the resulting 2,5-dichloro - 3 - cyanomethylthiophene via hydrolysis or alkanolysis and dechlorination to 3-thienylacetic acid or an alkyl ester thereof.

A second aspect of the invention provides the novel chemical compounds 2,5 - dichloro - 3 - cyanomethylthiophene, 2,5 - dichloro - 3 - thienylacetic acid and alkyl esters thereof. These compounds are useful as chemical intermediates for example in the above described synthetic route to useful penicillins.

The preferred method of carrying out the process of the invention to prepare compound (IV) involves the reaction of (III) with an alkali metal cyanide (e.g. NaCN or KCN) in a suitable solvent (e.g. water, an alkanol or acetone) in which the formed metal halide and the formed product have greatly different solubilities. A particularly suitable solvent system is a mixture of water and isopropanol.

An excess of cyanide ions will often be used and the product can be purified by using distillation techniques. However, often it will be converted to the compound (V) or (VI) without purification.

The 2,5 - dichloro - 3 - cyanomethylthiophene (IV) may be dehalogenated to give 3-thienylacetonitrile (V) by a standard dechlorination method e.g. by the use of aluminium amalgam or aluminium foil with a palladium catalyst; a preferred method involves the use of gaseous hydrogen over a palladium catalyst in the presence of calcium or barium carbonate.

A further aspect of the invention relates to the process for the conversion of an ester of 3-thienylacetic acid (VII, R″=alkyl) into a diester of 3-thienylmalonic acid (VIII) and thence to 3-thienylmalonic acid (IX) and penicillins of formula I.

A particularly advantageous synthesis of 3-thienylacetic acid esters (VII) involves the alkanolysis of the 3-thienylacetonitrile (IV) using hydrogen chloride dissolved in an alcohol, preferably ethanolic HCl. This has been found to give considerably better yields than the previously used process which involved the sulphuric acid catalysed alkanolysis of the nitrile (IV). (Campaigne et al., J. Amer. Chem. Soc., 1955, 77, 5425).

A preferred method of carrying out the process of the invention to prepare esters of 2,5-dichloro-3-thienylacetic acid (VI, R′=alkyl) involves the use of hydrogen chloride dissolved in an alcohol, preferably ethanolic HCl. A preferred method of preparation of 2,5-dichloro-3-thienylacetic acid (VI, R′=H) involves the use of an aqueous solution of a base, for example, NaOH or KOH.

2,5-dichloro-3-thienylacetic acid or its ester (VI) may be dehalogenated to give 3-thienylacetic acid or its ester (VII) by a standard dechlorination method, for example, one of those described above for the dechlorination of (IV).

Esters of 3-thienylacetic acid (VII, R″=alkyl) may be converted to diesters of 3-thienylmalonic acid by a standard malonic ester synthesis. However, a preferred technique involves the carbalkoxylation of an ester of 3-thienylacetic acid (VII) with a dialkyl carbonate in an alcohol containing an alkali metal salt of the alcohol (for example, diethyl carbonate in a solution of ethanolic sodium ethoxide). This one-stage process has the advantage of having a higher yield than the known two-stage method (Campaigne et al., J. Amer. Chem. Soc. 1955, 77, 5425).

Hydrolysis of dialkyl esters of 3-thienylmalonic acid to the parent acid (IX) may be carried out by an appropriate technique, however, a preferred method makes use of an aqueous solution of potassium hydroxide.

The conversion of 3-thienylmalonic acid to the penicillin of general formula (I) may be carried out by any convenient method; however, those methods described in British Patents Specification Nos. 1,004,670, 1,125,557, 1,133,886 and 1,197,973 may be used with advantage.

As before stated, the 2,5-dichloro-3-chloromethylthiophene (III) can be prepared in two known stages from thiophene. However, a preferred method of production of the compound (III) from 2,5-dichlorothiophene (II) involves the use of stannic chloride in methylene chloride. This method of production has an advantage over the known method (described in British Pat. No. 1,160,565) in that it does not involve the use of the dangerous and objectionable carbon disulphide. In turn the compound (II) may be prepared in excellent yield from thiophene by the reaction with preferably redistilled sulphuryl chloride in the presence of iodine. This method has the advantage that it does not give mixtures of products as do previously disclosed similar methods (e.g. that of Buzas et al., Bull. Soc. Chim. France, 1960, 793).

The following examples illustrate the invention:

Example 1.—Preparation of 2,5-dichloro-3-cyanomethylthiophene (a) 2,5-dichlorothiophene (II): Thiophene (37.5 kg.) and iodine (6.25 g.) were stirred together at 55°–60° C. for five minutes and then redistilled sulphuryl chloride (170.0 kg.) was added over about four hours at 65°–75° C. When the addition of sulphuryl chloride was complete the reaction mixture was refluxed for 2 hours, the temperature reaching a maximum of 90°–95° C. towards the end of this period. Excess sulphuryl chloride was removed by distillation under reduced pressure (about 100 torr) until the base temperature reached a maximum of 90° C. The crude 2,5-dichlorothiophene (II) was cooled to 20° C. and then fractionally distilled, the pure product being collected at 45° C.–48° C. at 12 torr, the yield being 58.1 kg. (85%).

(b) 2,5-dichloro-3-chloromethylthiophene (III): 2,5-dichlorothiophene (II) (75.0 kg.), chloromethyl methyl ether (46.2 kg.) and methylene chloride (120 l.) were mixed in a vessel and cooled to 0° C. Stannic chloride (43.2 kg.) was added to the stirred mixture over 5 hours, the temperature being kept between 0° and −10° C. After the addition was complete, the mixture was allowed to warm to 15° over about 1 hour. The reaction mixture was then slowly added to water (150 l.), the temperature being kept below 3° C. After quenching the water layer was removed and the organic phase washed with water (3× 27 l.) and then dried over anhydrous magnesium sulphate (7.5 kg.), stirred for 20 minutes and filtered, the filter cake being washed with methylene chloride (2× 8 l.). The methylene chloride was removed under reduced pressure and the crude material fractionated under reduced pressure to yield 64 kg. (65%) of 2,5-dichloro-3-chloromethylthiophene (III) distilling at 92°–99° C. at 9 torr.

(c) 2,5-dichloro-3-thienylacetonitrile (IV): A reaction vessel was charged with a solution of sodium cyanide (25.4 kg./159 l. water) followed by isopropyl alcohol (159 l.) and the resulting solution heated to reflux. A solution of 2,5-dichloro-3-chloromethylthiophene (III) in isopropyl alcohol (84 kg./105 l.) was added to the refluxing cyanide solution over 1 hour, when addition was complete the reactants were refluxed for a further 1 hour. Isopropyl alcohol was distilled from the reaction, under reduced pressure keeping the base temperature below 60° C. The time taken to remove the isopropyl alcohol (250 l.) was 3¾ hours. The residue remaining in the reaction vessel was cooled to 25° C., extracted with methylene chloride (1× 118 l. and 2× 32 l.), the extracts separated, bulked, dried over magnesium sulphate and filtered; the filter case washed with methylene chloride (30 l.), and this also added to the bulked extracts. The methylene chloride was then removed by distillation at atmospheric pressure and finally under reduced pressure (about 200 torr) at a maximum internal base temperature of 100° C. The residue was transferred to a vacuum distillation unit with a fractionating column and the product distilled after removal of a small fore-run (solvent), the 2,5-dichloro-3-thienylacetonitrile (IV) distilling at 103°–105° C. at 0.3–0.5 torr. The yield of (IV) was 59.6 kg. (74.5%).

EXAMPLE 2.—Preparation of 3-thienylmalonic acid (a) 3-thienylacetonitrile (V): 2,5-dichloro-3-thienylacetonitrile (IV) (25 kg.), methyl alcohol (130 l.), water (6 l.), magnesium oxide (6.3 kg.), and the 5% palladium on calcium carbonate catalyst (7 kg.) were mixed in a flask. After purging with nitrogen the mixture was hydrogenated at 45° C.–55° C. for 4 hours at 8 p.s.i.g. of hydrogen. After this period the hydrogenator was purged with nitrogen, a further 5.0 kg. of 5% palladium on calcium carbonate catalyst added, the system repurged with hydrogen and hydrogenation continued for a further 5 hours at 50° C.–55° C., at 8 p.s.i.g. of hydrogen. After purging the hydrogenation system with nitrogen, the spent catalyst was filtered off and the filter cake washed with 20 l. of methyl alcohol. The methyl alcohol (about 120 l.) was removed by distillation and the residue placed in a 20 gallon glass-lined vessel, water (20 l.) added and the mixture cooled to 20° C. This mixture was then extracted with methylene chloride (1× 15 l. and 2× 10 l. portions), the combined methylene chloride extracts dried over magnesium sulphate, filtered, the filter cake washed with methylene chloride (4 l.) and finally the methylene chloride was removed by distillation. The crude 3-thienylacetonitrile (V) was transferred to a fractional distillation unit and the pure product collected at 78° C.–83° C. at 1.5 torr. The yield of (V) was 12.6 kg. (80%).

(b) Ethyl 3-thienylacetate (VII. R″ = Et): Ethyl alcohol (11 l.) was saturated with hydrogen chloride. Water (0.8 l.) was added and then 3-thienylacetonitrile (5 kg.) was added over ¼ hour at 40° C., the ensuing exothermic reaction causing the mixture to reflux. After the addition was complete the mixture was refluxed for a further 3 hours and then cooled to 20° C., poured on to water (50 l.) and extracted with methylene chloride (1× 20 l. and 1× 9 l.). The organic extracts were combined, washed with saturated bicarbonate solution (6 l.), dried over anhydrous magnesium sulphate, and filtered. The methylene chloride was removed by distillation and the ethyl-3-thienylacetate (VII, R″ = Et) distilled at 107–108° C. at 12 torr to produce 6.38 kg. (93%) of pure material.

Methyl 3-thienylacetate (VII, R″ = Me) was prepared in the same yield in an analogous manner.

(c) Diethyl 3-thienylmalonate (VIII, R″ = Et): To diethyl carbonate (110.0 l.) and ethyl 3-thienylacetate (VII, R″ = Et) (13 kg.) at 115° C. was added over 1½ hours a solution of sodium ethoxide in ethanol (1.94 kg. sodium/42.9 l. ethanol), the rate of addition being adjusted to maintain a reaction temperature of 110° C. Ethanol (60 l.) was removed through a condenser maintained at a temperature so as to retain the diethyl carbonate. Heating was continued for a further hour when an additional 6 l. of ethanol was removed. The reaction mixture was cooled to 20° C., acidified to a pH of 1.5 by the addition of 40 l. of 2 N hydrochloric acid. The organic layer was separated, washed with saturated sodium bicarbonate solution (2× 5 l.), dried over anhydrous magnesium sulphate, filtered off and the filter cake washed with diethyl carbonate. Using a fractionating column the excess diethyl carbonate was distilled off and the diethyl 3-thienylmalonate (VIII, R″ = Et) collected at 118° C.–121° C. at 0.5 torr. The yield of (VIII, R″ = Et) was 11.9 kg. (83%).

Dimethyl 3-thienylmalonate (VIII, R″ = Me) was prepared in the same yield in an analogous manner.

(d) 3-thienylmalonic acid: Diethyl 3-thienylmalonate (VIII, R″ = Et) (18 kg.) was added over 1¼ hours to aqueous potassium hydroxide (10.5 kg./18.7 l.); during the addition the temperature reached about 70° C. The mixture was refluxed for a further 2 hours then cooled to 30° C., when water (10 l.) was added and the mixture washed with diethyl ether (1× 30 l. and 3× 10 l.). The aqueous layer was cooled to 10° C. and then acidified to pH 1.0 with hydrochloric acid (14 l.), the temperature being kept between 10° and 14° C. The acidified solution was extracted with diethyl ether (1× 30 l. and 3× 10 l.), the organic extracts dried over anhydrous magnesium sulphate and the ether removed under reduced pressure at a temperature below 20° C. The resulting solid 3-thienylmalonic acid was slurried with benzene (23 l.), filtered and the resulting filter cake washed with benzene (3× 3 l.). The washed 3-thienylmalonic acid (IX) was dried at 25°–50° C. to yield 11.1 kg. (80%) of white crystalline solid, m.p. 141°–142° C.

Example 3.—Preparation of 3-thienylmalonic acid (a) Ethyl 2,5-dichloro-3-thienylacetone (VI, R′=Et): (b.p.=118–123° C./1 mm.) was prepared from 2,5-dichloro-3-thienylacetonitrile (IV) by a method analagous to that used for the preparation of ethyl-3-thienylacetate (VII, R″=Et) described in Example 2(b). The ethyl 2,5-dichloro-3-thienylacetate (VI, R′=Et) was also prepared by the esterification of 2,5-dichloro-3-thienylacetic acid (VI, R′=H) (m.p. 100–102° C.) with ethanol and gaseous hydrogen chloride. The 2,5-dichloro-3-thienylacetic acid (VI, R′=H) was prepared from 2,5-dichloro-3-thienylacetonitrile (IV) by acid hydrolysis.

(b) Ethyl 3-thienylacetate (VII, R″=Et) was prepared from ethyl 2,5-dichloro-3-thienylacetate (VI, R′=Et) by a dechlorination method analagous to that used for the preparation of 3-thienylacetonitrile (V) described in Example 2(a).

(c) 3-thienylmalonic acid was prepared from the 3-thienylacetic acid ester (VII, R″=alkyl) via a diester of 3-thienylmalonic acid (VIII, R″=alkyl) as described in Example 2(c), (d).

We claim:

1. A process for the production of 3-thienylacetic acid or an alkyl ester thereof which comprises:
   (a) chlorinating thiophene to produce 2,5-dichlorothiophene;
   (b) chloromethylating the 2,5 - dichlorothiophene to produce 2,5-dichloro-3-chloromethylthiophene;
   (c) reacting the 2,5-dichloro-3-chloromethylthiophene with cyanide ions to produce 2,5-dichloro-3-cyanomethylthiophene; and
   (d)(1) hydrolysing or alkanolysing and dechlorinating or (2) dechlorinating and hydrolysing or alkanolysing the 2,5-dichloro-3-cyanomethylthiophene to produce 3-thienylacetic acid or an alkyl ester thereof.

2. A process according to claim 1 wherein the source of the cyanide ions is an alkali metal cyanide.

3. A process according to claim 2 wherein the alkali metal cyanide is dissolved in a suitable solvent.

4. A process according to claim 3 wherein the alkali metal cyanide is sodium cyanide or potassium cyanide.

5. A process according to claim 4 wherein the solvent is water and alkanol or acetone.

6. A process according to claim 4 wherein the solvent is a mixture of water and isopropanol.

7. A process according to claim 1 wherein the 2,5-dichloro-3-cyanomethylthiophene is first subjected to hydrolysis or alkanolysis and the resulting 2,5-dichloro-3-thienylacetic acid, or an alkyl ester thereof, is subsequently dichlorinated.

8. A process according to claim 1 wherein 2,5-dichloro-3-cyanomethylthiophene is first dechlorinated and the resulting 3-thienylacetonitrile is subjected to hydrolysis or alkanolysis.

9. A process according to claim 1 wherein the alkanolysis comprises using hydrogen chloride dissolved in an alcohol.

10. A process according to claim 9 wherein the alcohol is ethanol.

11. A process according to claim 1 wherein the hydrolysis comprises reaction of the 2,5-dichloro-3-cyanomethylthiophene or 3-cyanomethylthiophene with an aqueous solution of a base.

12. A process according to claim 11 wherein the base is sodium or potassium hydroxide.

13. A process according to claim 1 wherein the dechlorination comprises reacting 2,5-dichloro-3-cyanomethylthiophene or an ester of 2,5-dichloroethiophene with gaseous hydrogen over a palladium catalyst in the presence of calcium or barium carbonate.

14. A process according to claim 1 wherein the chlorination of thiophene comprises reacting thiophene with sulphuryl chloride in the presence of iodine.

15. A process according to claim 1 wherein the chloromethylation comprises reacting 2,5 - dichlorothiophene with stannic chloride and chloromethyl methyl ether in methylene chloride.

References Cited

UNITED STATES PATENTS

| | | | |
|---|---|---|---|
| 3,634,405 | 1/1972 | Holdrege | 260—239.1 |
| 3,669,958 | 6/1972 | Holdrege | 260—239.1 |
| 3,487,074 | 12/1969 | Sheehan | 260—239.1 |
| 2,562,411 | 7/1951 | Behrens et al. | 260—239.1 |

HENRY R. JILES, Primary Examiner

C. M. S. JAISLE, Assistant Examiner

U.S. Cl. X.R.

260—239.1, 332.5